United States Patent [19]

Smith

[11] 4,165,791
[45] Aug. 28, 1979

[54] AUTOMATIC WEIGHT SWITCHING MECHANISM FOR SUBSTITUTION TYPE ANALYTICAL BALANCES

[75] Inventor: James E. Smith, Boulder, Colo.

[73] Assignee: Denver Instrument Company, Denver, Colo.

[21] Appl. No.: 772,650

[22] Filed: Feb. 28, 1977

[51] Int. Cl.² .............................................. G01G 1/40
[52] U.S. Cl. .................................. 177/212; 177/250; 177/DIG. 3
[58] Field of Search ................... 177/210 C, 212, 213, 177/214, 215, 204, DIG. 3, 246, 248, 250

[56] References Cited

U.S. PATENT DOCUMENTS

| | | | |
|---|---|---|---|
| 3,055,444 | 9/1962 | Chyo | 177/213 X |
| 3,684,875 | 8/1972 | Smith | 177/210 C X |
| 3,786,678 | 1/1974 | Kunz | 177/212 X |
| 3,816,156 | 6/1974 | Baumann | 177/212 X |
| 4,067,408 | 1/1978 | Dodds | 177/210 C |

Primary Examiner—Joseph W. Hartary
Attorney, Agent, or Firm—Ralph F. Crandell

[57] ABSTRACT

A weight switching mechanism for a substitution type analytical balance is provided which permits the automatic selection and lifting of the required substitution weights from the gimbal assembly of a balance beam to allow accurate weighing of an unknown mass. A capacitive/electromagnetic feedback device is provided for sensing changes in the relative balance of the beam with respect to the applied unknown mass. The resultant current is applied to a force coil which maintains the beam in null position. A current related signal is converted to a digital input signal which is applied to a memory and control circuit and electronically displayed. A series of electromagnets, mounted below a printed circuit board and positioned to correspond with each substitution weight, is provided. The printed circuit board is arranged to lift upon release of the balance beam. The release of the beam causes the control circuit to selectively energize those magnets whose corresponding weights approximate the total weight of the unknown mass. The raising of the printed circuit board removes the selected weights from the gimbal assembly allowing a precise measurement of the remaining unbalance.

17 Claims, 7 Drawing Figures

AUTOMATIC WEIGHT SWITCHING MECHANISM FOR SUBSTITUTION TYPE ANALYTICAL BALANCES

BACKGROUND OF THE INVENTION

This invention is directed to an analytical balance for electronically measuring an unknown mass and digitally displaying the results. It is more specifically directed to a substitution type analytical balance in which the gimbal or substitution weights are selectively removed automatically in direct response to a digital input signal converted from the analogue output of the beam feedback and null restoring circuit.

In the past, it has been customary practice to provide analytical balance mechanisms wherein displacement of a balanced beam is sensed and converted to an electrical control signal. This control signal is applied as a null restoring force through a coil to maintain the beam in its null reference plane. In some cases the amplitude of the control signal developed for restoring the beam is read directly by a suitable display device for showing the weight of the unknown mass.

An example of this type of device is described in U.S. Pat. No. 3,604,525, entitled "Automatic Top-Loading Weigh Apparatus with Electronic Measuring and Recording Circuit", issued Sept. 14, 1971 to the assignee of the present invention. A differential capacitance value is developed by sensing the vertical displacement of an unbalanced beam. This capacitance value through a capacitance bridge circuit is differentially measured by the monitor and control circuit, converted to a variable current output and is applied to an electromagnetic coil to return the beam to its null position. A resultant voltage is developed in direct proportion to the current required to return the beam to its null position. This voltage representing the unknown weight is then displayed by means of a digital voltmeter directly calibrated to read in units of weight.

Another common type of analytical balance which is presently used to provide increased accuracy is known as the substitution type balance. In this balance a horizontal beam is pivotally mounted on a knife edge with a counterweight provided at one end and a weigh pan supported from a gimbal assembly arranged at the opposite end. A plurality of calibrated weights which total the maximum weighing capacity of the balance are suspended from the gimbal assembly. The combined weight of the gimbal assembly, weigh pan and substitution calibrated weights equal the counterweight and keeps the beam balanced in its null reference plane. With an unknown mass placed in the weigh pan, the calibrated weights are systematically removed through a series of mechanical cams and levers until the beam is returned to its null or balanced condition. The total weight of the calibrated substitution weights which were removed to accomplish this balance is equivalent to the unknown mass placed in the weigh pan.

One of the major problems encountered with the substitution type balance, in which the weights are mechanically removed from the gimbal assembly, is the inherent lag and backlash that is present in this type of mechanism. With the use of the cams and levers it is necessary to remove the weights one at a time in sequence which sometimes applies perturbations to the beam which additionally increases the time required to make an accurate measurement.

In order to eliminate this type of problem and to greatly improve the accuracies that can be obtained, it is an object of the present invention to combine the attributes of the substitution balance with the electronic circuitry, utilizing both the capacitive feeback sensors and beam null restoring force coil.

It is another object of the present invention to provide a more rapidly responding system in order to reduce the time required for obtaining readings with a substitution type analytical balance.

Another object of the present invention is to provide a system for automatically and simultaneously removing selected weights from a substitution type balance to allow rapid and accurate weighing of an unknown mass to an accuracy of at least plus or minus 1/10 milligram.

It is a still further object of the present invention to provide an analytical balance in which the output signal for the beam null restoring coil is converted to a digital signal which can be more easily displayed and retained in memory for a later use.

It is a still further object of the present invention to provide an electronic tare circuit for an analytical balance in which the electronic output signal which is proportional to the unknown weight can be stored in a cumulative memory circuit while the display is returned to zero reference for canceling out the weight of a container or a previously weighed mass.

SUMMARY OF THE INVENTION

This invention combines the advantages and features of a substitution type analytical balance with electronic circuitry utilizing analogue and digital data outputs. The digital output is used for obtaining automatic selection and removal of substitution weights to obtain a rapid and accurate digital weight readout of an unknown mass.

A temperature compensated beam pivotally mounted on an upright knife edge is provided with a counter balancing weight fixedly positioned near one end. At the same end is suspended an electromagnetic force coil positioned within a stationary permanent magnet. In order to properly energize the force coil to maintain the beam in its balanced or null reference plane, a pair of opposed capacitor plates, arranged to move with the beam, are positioned with respect to a pair of stationary plates. These capacitors are combined to form a capacitance bridge, the output voltage of which is compared with a known voltage source in an integrator to produce an analogue current output. This current is conducted to the force coil where the resultant current biases the coil to maintain the beam in its proper null position.

Through suitable logic circuitry, this analogue signal is also converted to a digital output signal which is counted and electronically displayed. This display is calibrated directly in units of weight and represents the weight of the unknown mass. This conversion from the analogue signal to the digital signal and its use in the display and weight selection feature to be described is of major importance in this invention.

At the opposite end of the beam is located a gimbal assembly supported on an inverted knife edge on the opposite side of the beam from the beam support knife edge. The lower end of the gimbal assembly includes a weigh plan for supporting the unknown mass. The gimbal assembly allows for movement around two perpendicular axes so the unknown weight will be applied in a vertical direction to the balance beam. Suspended immediately below the gimbal assembly is a plurality of outwardly extending arms which support a number of calibrated substitution weights.

A pivoted lever arm is incorporated in conjunction with the beam support for releasing and arresting the balance beam as desired. In the arrested position the lever locks the beam in rigid position and at the same time lowers a printed circuit board held generally in a horizontal position to meet the individual calibrated weights and their associated individual lifting hangers. An electromagnet is mounted to the underside of the printed circuit board in conjunction with the position of each of the calibrated weights. The releasing of the arresting lever automatically raises the printed circuit board and the associated electromagnets approximately one-fourth of an inch.

The digital output signal which is used for the electronic display of the unknown weight is further conditioned through a plurality of counters with the resultant digital number stored in a memory device located in the magnet control circuit. This resultant signal is proportional to the force coil current which is required to null and balance the beam. It also is directly proportional to the weight of the unknown mass placed in the weigh pan of the balance. Since the force coil is required to counterbalance the weight of the entire unknown mass placed in the pan, this signal is only moderately accurate and thus, is a coarse indication of the unknown weight.

A second and much more accurate measurement of the unknown weight is accomplished automatically by arresting the beam and releasing it again within a preset, timed period of approximately three seconds.

Upon releasing the arrest lever the second time, the digital input signal stored in the magnet control circuit memory is withdrawn and conditioned through suitable logic circuits to automatically energize one or more electromagnets on the underside of the control board to raise selected weights which approximate the weight of the unknown mass. The selected weights removed from the gimbal assembly always total less than but within one gram of the weight of the mass.

Therefore, with the beam balanced within one gram, the capacitive feedback circuit again produces a current which is applied to the force coil. The difference this time is that due to the reduced unbalanced condition the current fed to the force coil is extremely small and is precisely measured to produce an accurate electronic digital output which is indicative of the remaining unbalance. By combining the totals of the original signal and the final accurate signal of the remaining unbalance, a final and total measurement can be displayed which is within at least one-tenth of a milligram of the actual weight of the unknown mass.

The accuracies that can be obtained in the present invention far exceed the capabilities of the balances presently available on the market. The automatic substitution weight selection and removal from the gimbal assembly contributes to this accuracy and is an important and novel feature of the present invention.

Suitable temperature compensation circuits and frequency dividing circuits are utilized throughout the electronic circuitry to dampen the output signals to prevent unstable operation and proper response time.

A tare operation is also provided as an additional important feature of the present invention in conjunction with the display and magnet circuitry. By activating a switch during either the coarse or fine weighing mode, the digital display signal is recorded in a memory device and the actual display is converted back to a zero reference. The weight of additional objects added to the weigh pan is added to the digital signal stored in the memory and the display shows only the weight of the added mass. This display reading is the difference between the total weight in the pan and the memory stored tare weight. In this way, the weight of a container can be nullified to obtain only the weight of the unknown mass or a number of unknown masses can be sequentially added and separately weighed.

BRIEF DESCRIPTION OF DRAWINGS

Other features of this invention will appear in the following description and appended claims, reference being made to the accompanying drawings forming a part of the specifications where like reference characters designate corresponding parts in the several views.

DETAILED DESCRIPTION OF THE EMBODIMENTS

Figure 1:
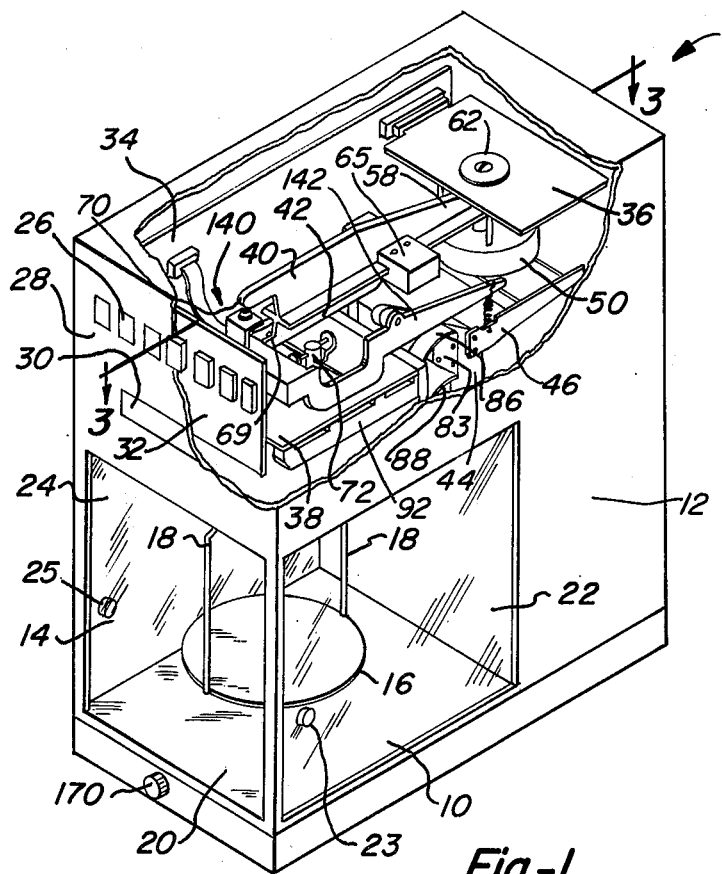
FIG. 1 is a prospective view of a substitution type analytical balance according to the present invention showing the upper part of the case cut away to reveal the relative position of the components of the balance.

Turning now more specifically to FIG. 1, a substitution type analytical balance B is shown and illustrated in a perspective arrangement. The balance B has a base plate 10 and case 12 which has a weighing cavity 14. A weigh pan 16 is suspended by a pair of stirrup type support rods 18 from a gimbal assembly 72 suspended above.

The weigh cavity 14 is surrounded by a window 20 located at the end of the case with slidable windows 22,24 positioned along the sides of the case in suitable guide rails. Knobs 23,25 are provided on the slidable windows 22,24 so that the windows can be opened and closed prior to each weighing cycle.

Figure 2:
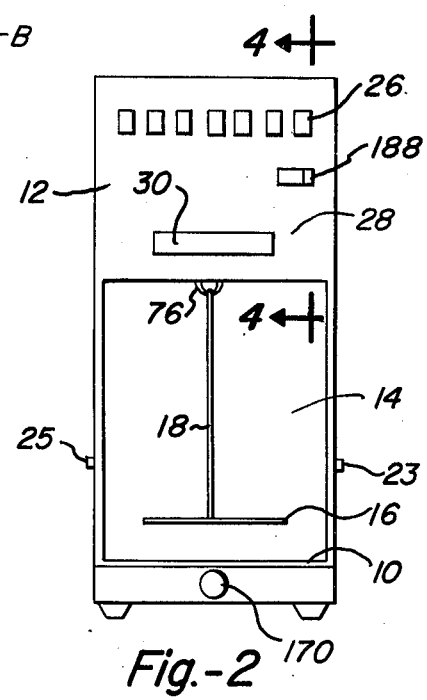
FIG. 2 is a front elevation view of the balance shown in FIG. 1 which illustrates the location of the seven digit visual display in relation to the weigh pan for supporting the unknown mass.

A seven digit electronic display device 26 is provided in the upper portion of the front 28 of the case 12, as is shown in FIG. 2. A tare bar 30 which actuates a switch (not shown) is provided in the front panel 28 immediately below the display 26. Pressing downward on the tare bar 30 in turn actuates the switch which performs the tare functions which will be described below.

In the upper portion of FIG. 1, the case 12 is shown cut away revealing the display printed circuit board 32 upon which is mounted the seven light emitting diode (LED) displays 26 mounted directly behind the front panel 28. Along the side of the balance, as seen in FIG. 1, is the computer circuit board 34 and horizontally mounted to the rear of the balance is the capacitor feedback restoring circuit board 36. The only other remaining printed circuit board in this system is the electromagnet weight lifting circuit board 38 which is horizontally positioned below one end of the balance beam 40, shown best in FIGS. 4 to 6.

Figure 3:
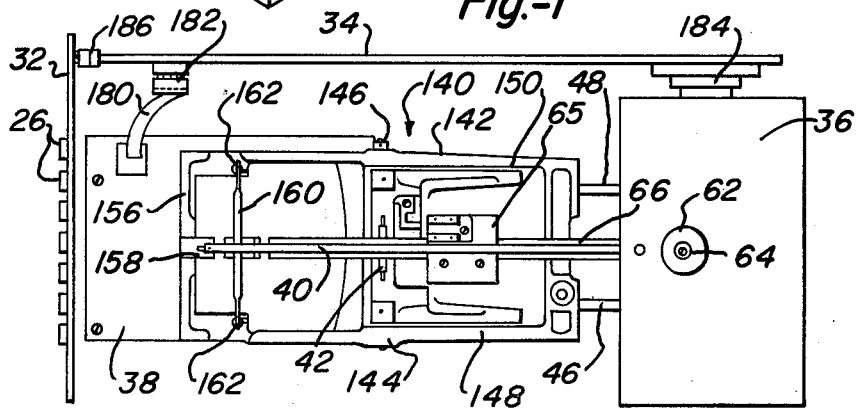
FIG. 3 is a partial top plan view of the balance with the case removed and taken along the lines 3—3 of FIG. 1, showing the display circuit board on the left side and the computer circuit board at the top.
Figure 4:
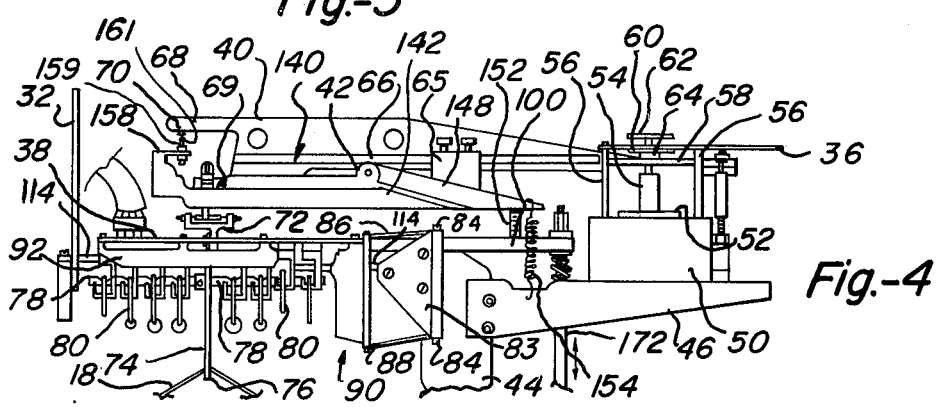
FIG. 4 is a partial side elevation view with the case of the balance removed showing the relationship of the balance beam with respect to the gimbal assembly and the supported calibrated weights suspended under the magnet circuit board, and the relative position of the feedback capacitors and force coil at the opposite end of the beam.

Referring now to FIG. 4 where the mechanical mechanisms of this analytical balance can better be seen, the balance beam 40 is supported on an upright transversely extending knife edge 42. This knife edge, as is customary, can be fabricated from imitation or genuine semiprecious materials such as saphire or the like. The sharp edge rests in a shallow transverse groove which is a base mount formed in the under surface of the balance beam 40. The beam knife edge support 42 is mounted on an upward curved extension of the column support 44 which is securely mounted to the baseplate 10 of the analytical balance. As can be seen, the entire mechanical mechanism of the balance is supported from the upper portion of the support column 44. To the right of the support column 44, as viewed in FIGS. 3 and 4, is a pair of outwardly extending support arms 46, 48. A short cylindrical permanent magnet 50 is supported on the upper surface of the support arms 46, 48 and serves as part of the beam nulling mechanism. An electromagnet 52 is suspended by threaded stud 54 from the end 58 of the balance beam 40. With the electromagnet 52 properly positioned within the permanent magnet 50, the application of a resultant current to the electromagnet will force the electromagnet either up or down with respect to the lines of flux of the permanent magnet 50 causing a compensating balancing force to be applied to the end 58 of the balance beam 40 to counteract any unbalancing force that may be present at the opposite end 68 of the beam.

The capacitor feedback printed circuit board 36 is mounted above the permanent magnet 50 by means of three threaded standoff spacers 56. Thus it can be easily seen that the printed circuit board 36 is rigidly mounted from the support column 44 in a position above the end 58 of the balance beam 40. From the upper side of the end 58 of the beam 40 is mounted a pair of metallic discs 60, 62 which are supported in spaced relation on a threaded support shaft 64. The support shaft 64 passes through an opening in the printed circuit board 36 and allows the capacitor plates 60,62 to move upwardly or downwardly with respect to the printed circuit board 36 as the beam deflects upwardly or downwardly respectively in response to any unbalanced forces. The printed circuit conductors on the upper and lower surface of the printed circuit board 36 forms a pair of rings (not shown) surrounding the opening for the shaft 64, and each ring is of generally the same diametrical size as the capacitor plates 60,62. The rings define a pair of spaced, stationary capacitor plates, and in conjunction with corresponding movable capacitor plates 60,62 form a pair of variable capacitors forming a portion of an electronic circuit which provides a feedback signal which is an indication of any deflection in the balance beam 40.

This feedback signal is generated by movement of the moveable plates 60,62 with respect to the stationary plates on the printed circuit board 36. If the end 58 of the beam 40 is moved upwardly in response to a weight applied to the opposite end 68, the bottom moveable capacitor plate 60 will move closer to the corresponding stationary plate on the underside of the printed circuit board. At the same time, the top moveable capacitor plate 62 would move away from the corresponding fixed capacitor plate positioned on the top of the printed circuit board 36. In this way the capacitance of the bottom pair of plates would increase while the capacitance of the corresponding capacitor on the top would decrease. With these two capacitors arranged as part of a capacitance bridge, which will be explained later, a resultant signal which is responsive to the deflection of the balance beam 40 is produced.

A counterweight 65 is slidably mounted on the transverse flange 66 of the beam 40. The counterweight 65 can be slideably moved longitudinally along the beam either towards or away from the knife edge to change its moment arm in order to balance the beam 40 in its null balanced reference plane.

The left end 68 of the beam 40, as viewed in FIG. 4, is provided with outwardly extending arms 69 and 70. The outwardly extending lower arm 69 has a pivot mount which mates with an inverted knife edge (not shown) which supports a gimbal assembly 72 suspended below the beam. The gimbal assembly, as is well known, includes a pair of perpendicular pivotal shafts which are arranged to allow movement around two perpendicular axis. A support rod 74 having a hook 76 extends downwardly from the gimbal assembly with the weigh pan stirrup rods 18 attached to the hook 76. The gimbal assembly 72 suspended from the knife edge on the upper surface of the arm 69 allows the weight of an unknown mass placed in the weigh pan 16 to act as a vertical force on the end 68 of the balance beam 40.

Figure 5:
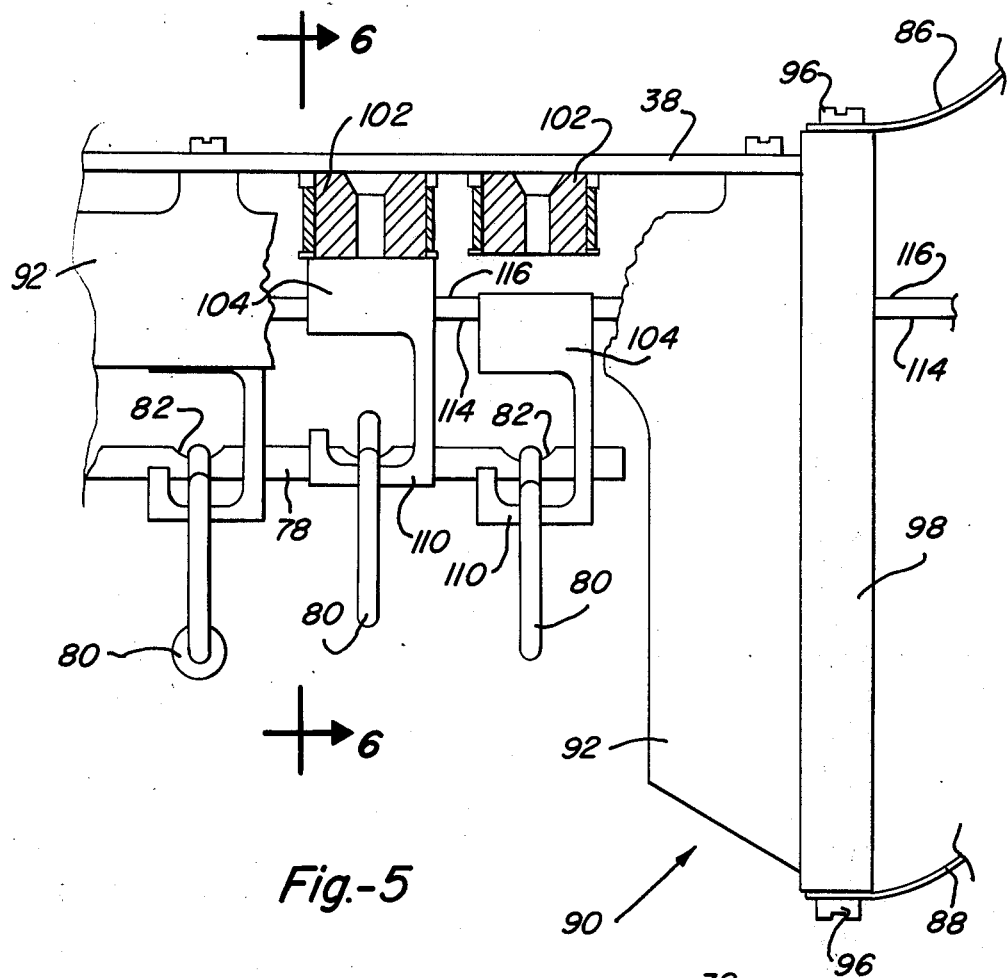
FIG. 5 is an enlarged partial side view showing a portion of the frame cut away to reveal the electromagnets used to selectively raise and remove weights from the gimbal structure.

A plurality of horizontally arranged weight support rods 78 are joined to the central portion of the support rod 74. As is also shown in FIG. 5, a number of incremental calibrated weights 80 varying from as much as 40 grams down to as small as 1/2 gram are spaceably hung from the rods 78 and positioned by notches 82 formed in the upper surface. The weights 80 are provided in pairs and the weights of each of these pairs are diagonally arranged on the support rods 78 to form a generally balanced arrangement with respect to the gimbal rod 74.

The weights provided herein are essential to the substitution type analytical balance. With the weigh pan empty and the calibrated weights and gimbal assembly mounted on the end 68 of the beam 40 and with the counterweight 65 properly positioned toward the opposite end 58, the beam 40 is at rest in its null balanced referenced plane. As is common in substitution type balances, when weighing an unknown mass placed in the weigh pan 16, the calibrated weights 80 are systematically lifted and removed from contact with the gimbal assembly until the beam is again balanced or returned to its referenced plane. The number of weights removed, thus, corresponds to the approximate weight of the unknown mass.

An important feature of the present invention is the capability of automatically selecting and simultaneously lifting the required weights from the gimbal assembly in an automatic operation. Mounted towards the front side of the support column 44 are a pair of triangular support brackets 83 which are mounted on each side of the support column 44 by means of suitable fasteners such as screws or bolts, one such bracket 83 being shown in FIGS. 1 and 4. A pair of cap screws 84 positioned at the top and bottom of each bracket 83 form a connection for one end of a pair of flectures 86 and 88. These flectures 86 and 88, also shown in FIG. 5, are provided on each side of the support column 44 and are actually leaf springs which are biased to support a magnet printed circuit board structure 90. A pair of elongated support brackets are each positioned along opposite sides of the electromagnet printed circuit board 38, one support bracket 92 being shown in FIGS. 1, 4 and 5. The ends of the flectures 86, 88 are attached by a second pair of cap screws 96 to the top and bottom of the shoulders 98, (FIG. 5) respectively of the brackets 92.

The flectures 86, 88 on each side of the printed circuit board support structure 90 are the same length. Thus, as the support structure 90 and the printed circuit board 38 move up and down, the shoulder 98 remains parallel at all times with the rear edge of the triangular brackets 83. In this way, the printed circuit board 38 is always maintained in a horizontal position and parallel to the substitution weight support rods 78. A control arm 100 (FIG. 4) is mounted on the rear edge of the circuit board support structure 90 and is arranged to control the up and down movement of the printed circuit board 38. It is well to note that the printed circuit board has a large aperture (not shown) formed in the middle portion to prevent contact with the gimbal assembly which is arranged above and below the board.

Figure 6:
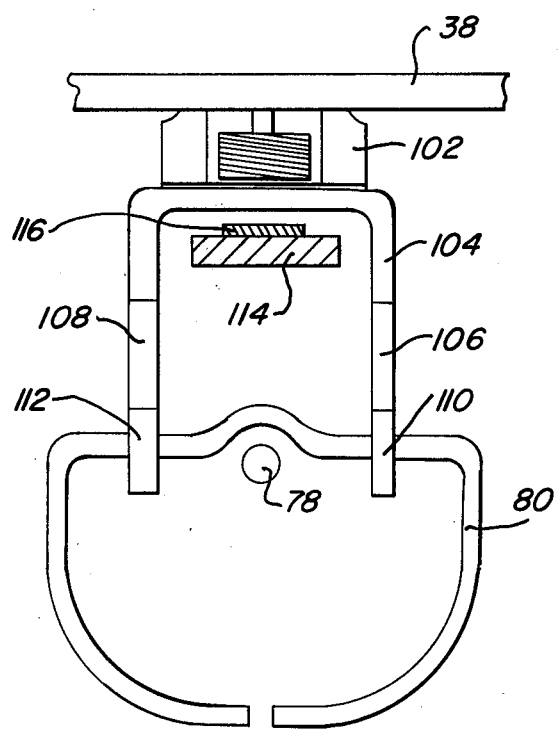
FIG. 6 is an enlarged partial end view taken along the lines 6—6 of FIG. 5 and shows the relative position of a calibrated weight suspended above the gimbal support by means of the energized electromagnet and weight hanger.

Below the printed circuit board 38 are suitably mounted a plurality of electromagnets 102 shown in FIGS. 5 and 6. In the present embodiment, a total of 16 electromagnets are suspended below the printed circuit board and each is aligned vertically with the position of a corresponding calibrated weight 80. The electromagnets 102 are electrically connected to the printed circuit conductors provided on the surface of the printed circuit board 38. Thus, each magnet, corresponding with a particular weight, can be selectively energized as desired. Directly below each electromagnet 102 is a weight hanger 104. Each weight hanger 104 has downwardly extending arms 106, 108 and forwardly extending fingers 110, 112.

The U shaped weight hangers 104 straddle and are supported by an elongated support member 114. A layer of resilient material 116, such as rubber, foam plastic or the like, can be provided on the upper surface of the support member 114 to quiet and cushion the action of the weight hangers 104. The weight hangers 104 are fabricated from a ferrous type metal which is attracted by electromagnetic flux upon the energization of the electromagnets 102. When the weight hangers are at rest, they are supported on the resilient surface 116, and the arms 106, 108 extend downwardly with the fingers 110, 112 positioned below and out of contact with the calibrated weights 80. In the at rest position, the printed circuit board 38 and the electromagnets 102 rest on the upper surface of the weight hangers 104.

Upon energizing the selected magnets 102 corresponding to the desired weights to be lifted, the printed circuit board and magnets 102 are raised upon the release of the balance beam 40. The upward movement of the energized magnets 102 causes the corresponding weight hangers 104 to rise causing the fingers 110 and 112 to lift the selected weight 80 from the weight support arms 78. Thus, the upward movement of the printed circuit board 38 and magnets 102 raise the corresponding weights 80 substantially restoring the balance of the beam 40 during a weighing operation.

In the present invention, an arrest and release mechanism 140 is provided for the balance beam 40, as is shown primarily in FIGS. 3 and 4. A U-shape frame 142 is pivotally mounted on each side at 144 and 146 to the upper end of the support column 44. The rearwardly extending legs 148, 150 of the frame 142 are positioned in physical contact by an adjustable contact screw 152 with the upper surface of the magnet circuit board control arm 100. A spring 154 biases the legs 148, 150 in a downward direction.

The forward end 156 of the arrest frame 142 includes a shoulder 158 having a pin 159 aligned to engage with a socket 161 provided in the underside of the upper beam arm 70. The gimbal assembly includes a transversely extending arm 160. The outwardly extending ends of the arm 160 are positioned above a pair of mounts 162 provided on the upper surface of the arrest frame 142.

On the front panel 28 of the analytical balance beam is located a control knob 170 shown in FIGS. 1 and 2. This knob is used in the weighing process for arresting and releasing the balance beam 40. The knob 170 is attached to one end of a shaft (not shown) which has an offset cam and follower attached at the opposite end. The follower is attached to the control rod 172 (FIG. 4) which has its upper end secured to the printed circuit board control arm 100.

By turning the control knob 170 in the direction for arresting the beam, the control rod 172 moves downward and pulls the control arm 100 downward, operatively positioning the printed circuit board with the electromagnets against the upper surface of each of the weight hangers 104. This downward movement of the printed circuit board control arm 100 allows the arm 148, 150 of the arrest frame 142 to pivot downwardly thus causing the opposite end 156 of the frame to move in an upward direction. This movement causes the pin 159 on the shoulder 158 to engage the socket 161 on the underside of the beam arm 70 causing the beam to lift preventing its free movement. As the end 156 of arrest frame 142 moves upward the mounts 162 engage each end of the transverse arm 160 causing the gimbal assembly and weigh pan to be raised out of contact with the beam. Thus, the movement of the beam is restricted and the weight of the weigh pan and substitution weights are simultaneously removed from the beam.

In the converse, the rotation of the knob 170 in the opposite direction moves the control rod 172 in an upward direction raising the control arm 100 causing the printed circuit board 38 and support structure 90 to be raised in an upward direction biased by the flectures 86 and 88. At the same time the adjustment screw 152 biases the arms 148, 150 of the arrest frame 142 upward causing the frame end 156 to move downward. This downward action of end 156 returns the knife edge support for the gimbal assembly and weigh pan into contact with the pivot mount on the beam and at the same time lowers the pin 159 from the socket 161 on the upper arm of the beam. This downward action of end 156 allows the beam to again move freely in response to any unbalanced condition caused by the weight of the unknown mass on the gimbal assembly.

The various printed circuit boards are inter-connected by suitable connectors and cables. The electromagnet printed circuit board 38 is connected to the computer circuit board 34 by means of the cable 180 and connector 182. The capacitor feedback circuit board 36 is connected by cable and connector 184 to the computer board 34. The computer circuit board 34 in turn is connected by electrical connector 186 to the display circuit board 32. In this way the necessary electronic circuitry is provided for the automatic operation of the analytical balance.

Figure 7:
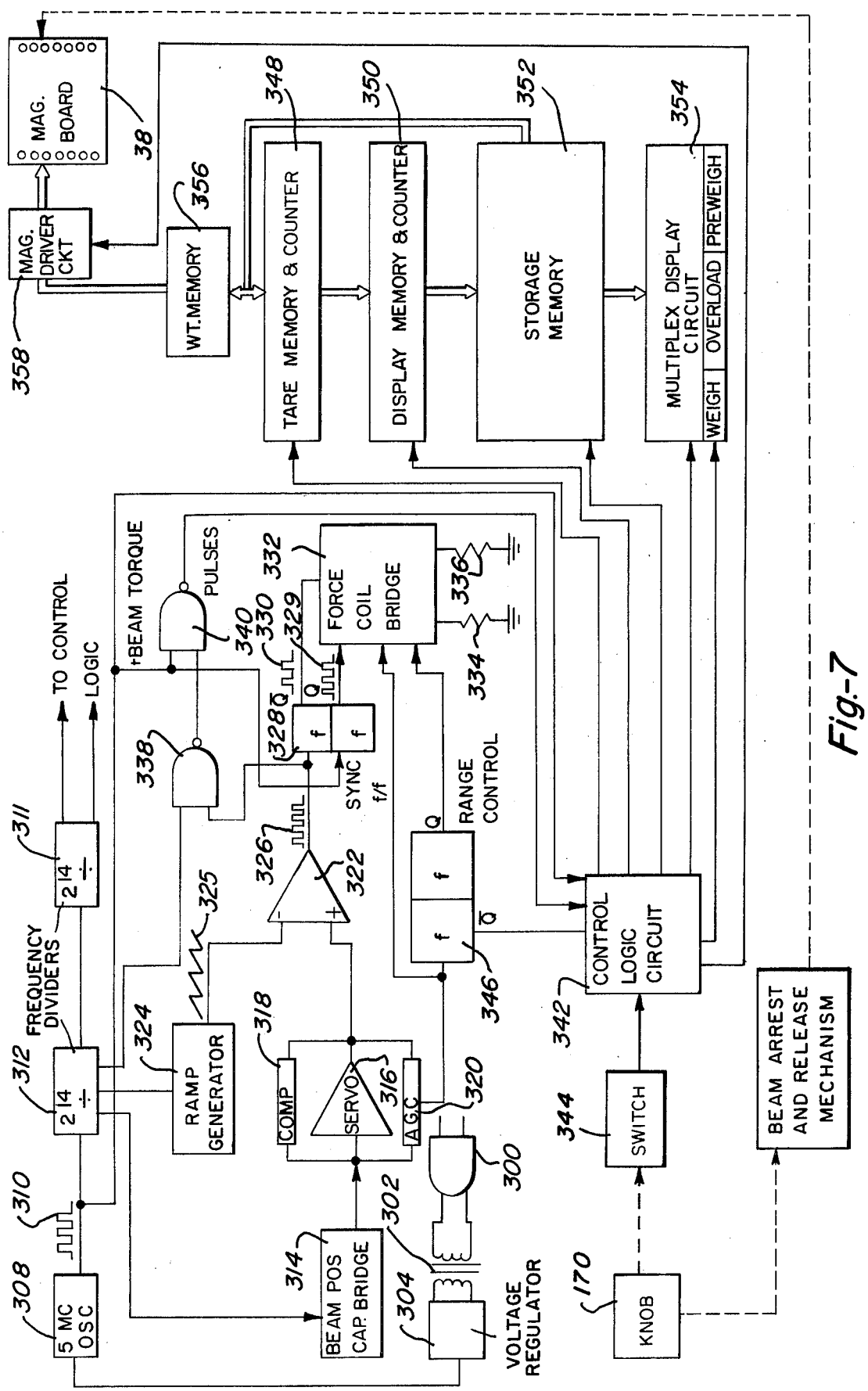
FIG. 7 is a block diagram showing the electronic logic circuit used to null the beam during weighing operations and for selectively removing the weights from the gimbal assembly during a weighing operation.

Referring now to FIG. 7, the electronic circuitry for this invention is diagrammatically illustrated. The circuitry is shown in FIG. 7 in terms of logic functions and it will be apparent to one skilled in the art as to the specific circuits necessary to provide each specific logic function. The circuitry may be connected to a conventional source of 110 volt alternating current by means of electrical conductor 300. This voltage is reduced through transformer 302 to a much lower voltage, such as 15 volts, and is supplied to a series type voltage regulator 304 whose output provides a constant voltage regardless of the current drawn. This constant 15 volt output of regulator 304 is supplied to an oscillator 308 which provides a 5 megahertz output. The output of oscillator 308 is a square wave form 310 as shown, which is supplied to a CMOS type frequency divider 312. This divider is capable of dividing the frequency from oscillator 308 by two up to the 14th power. Thus, one output of divider 312 provides a 2.5 megahertz input to the capacitor bridge circuit 314 which in turn provides an output having a phase shift that varies in accordance with the relative position of the capacitor plates 62, 64 which have been previously described. The output of the bridge circuit 314 is transmitted through a servo amplifier 316, a compensator circuit 318 and an automatic gain control 320. The voltage output of the amplifier 316 is an analogue voltage and is responsive to the out of balance condition of the beam which is determined by the change in position of the capacitor plates. In this way the coil current is operatively determined to be directly proportional to the weight of the article being weighed.

A second output from frequency divider 312 is provided to a ramp generator 324. The ramp generator provides a sawtooth signal shown at 325 which rises to about 10 volts in 50 microseconds or in the period of the second output frequency of divider 312. An output change occurs at comparator 322 when the output 325 of the sawtooth generator 324 passes through the output voltage level of the amplifier 316. This output of comparitor 322 is in the form of a square wave 326 as shown. In this way, the output of comparator 322 becomes the data input of a D type flip-flop 328. Also, a signal from oscillator 308 is provided as a clock input to flip-flop 328. As is understood in the art, during the positive excursions of the clock input, whatever the data input state is (i.e. high or low), it will transfer to the Q output and the opposite state will go to the $\overline{Q}$ output and will stay that way until the next clock pulse. Since the clock input pulses i.e. 310 are much faster than the comparator pulses i.e. 326, the flip-flop 328 is synchronized to the clock but has the basic shape of its outputs determined by the output pulses 326 from the comparator 322.

It will be apparent that the Q signal from flip-flop 328 follows the basic shape of comparator output signal 326 whereas the $\overline{Q}$ signal 330 is the inverse thereof. Thus, when the comparator turns off, then a low state exists at Q and $\overline{Q}$ goes high. The currents from Q and $\overline{Q}$ control bilateral transistor switches which form a part of a force coil bridge 332, the coil 52 of the bridge 322 is best seen in FIGS. 1 and 4. The current conducted by the bilateral switches through the force coil bridge 332 is fed into one of the two constant current sinks 334 and 336, respectively, one of which is for the preweigh or coarse mode of operation and the other is for the weigh or fine weigh mode of operation. If the time period from both Q and $\overline{Q}$ signals from flip flop 328 are equal, the net current through the coil 52 is zero and the coil will produce no net force on the balance beam in the balanced or null plane. However, if the time period is unequal one way or the other, there will be a net force on the coil forcing it either up or down. This pulls the coil in the proper direction to correct any unbalance in the capacitor spacing.

The time interval between the on and off time of Q and $\overline{Q}$ signals changes with the amount of balance error and balance error changes the pulse width at the output of the comparator 322. The greater the pulse width, the greater the error, and therefore, the greater the on time of the Q signal as compared with the on time of the $\overline{Q}$ signal. Conveniently, the balance is weighted one gram toward the weigh pan so that this amount of error is always in the system which serves to simplify the logic in determining the null point. The values of the components are selected so that there is a 50 percent duty cycle for Q and $\overline{Q}$, i.e., normally each one is high half of the time and low the other half of the time.

NAND gate 338 is provided with an input signal from divider 312 which is divided by $2^8$ and a second signal 326 from the output of comparator 322 to in turn provide an output which compensates for the one gram error on the balance by a time shift to compensate for this error. This signal then feeds into NAND gate 340 which also receives an output signal 310 from oscillator 308. The digital output signal from NAND gate 340 appears as packets or bunches of pulses which are proportional in number to the unknown weight in the pan. Since there are only about 256 maximum pulses per packet under the specific operating characteristics given herein, the accuracy is limited to 1 part in 256 parts. Therefore, the total pulses of all packets are counted in one second for the preweigh mode and in three seconds for the weigh mode and averaged over the total time period. This will give up to 5 million pulses in one second in the preweigh mode or up to 15 million pulses in three seconds for the weigh mode to facilitate very accurate readings.

A digital integrator within control logic circuit 342 divides by $2^6$ the number of pulses in one second for the preweigh mode and divides by $2^8$ the pulses in three seconds for the weigh mode.

A mechanical switch 344 shown in FIG. 7 is operated by means of knob 170 shown in FIG. 1. As previously described, the knob operatively raises magnet board 38 when the beam is released from the arrest position to the release or weighing position. This switch means 344 turns on the logic circuit 342 which receives the inputs previously described as well as an input from the $\overline{Q}$ output of flip flop 346 which provides a low signal to the control logic circuit 342 when a signal is received from automatic gain control 320 while providing a high signal to the force bridge coil circuit 332.

Outputs from the control logic circuit 342 are supplied respectively to tare memory and counter 348, display memory and counter 350 and, tare and display storage memory 352 and the seven digit multiplex display circuit 354.

When the tare switch 30 is pressed, and the balance is in the preweigh mode, the tare memory 348 counts the pulses in one second from the control logic circuit 342 which information is then jammed into display memory and counter 350 and into storage memory 352. The display memory 350 then counts down and any change in the number of pulses supplied by control logic circuitry 342 is used to indicate any change in the weight on the scale. This resulting weight measurement information is then jammed into memory 352 which information is scanned by multiplex display circuit 354. The logic circuit 342 provides appropriate signals to the multiplex display to cause it to display in either the preweigh or weigh mode or to indicate an overload.

At the same time that information is supplied from storage 352 to multiplex display circuit 354, the same information is supplied to weight lift memory 356 for the first three significant digits. This signal is then fed from the weight memory back to the tare memory and counter 348 and the cycle is again repeated with a specific known weight which gives a very precise weight in the weigh mode. The signal from the weight memory 356 is also fed to a magnet driver under control of the logic control circuit 342 which causes appropriate magnets on magnet board 38 to be energized, as previously explained. The digital signals recorded in the weight memory are received in binary coded form as is typical for many conventional memory chips. The signal recorded in the weight memory is thus a binary signal representative of weight. As previously noted, the count signals have been electrically proportionalized so that each count pulse sent to the counters in memories 348 and 350 from the logic control circuit 342 represents a fraction of a gram of weight. In the coarse (preweigh) weighing mode the proportionalization is one pulse per each gram of coarsely measured weight. Thus the number of pulses recorded initially in the weight memory 356 represents the number of grams of the weight measurement. The count signal is recorded in binary form in the memory chip 356, meaning that a separate digital output signal is present or absent to respectively indicate the presence of count signals in binary increments of 1's, 2's, 4's, 8's, 10's, 20's, 40's and 80's.

In the preferred embodiment as previously discussed the weights 80 are provided in pairs, each weight ranging from 40 grams to ½ gram. The weights are diagonally arranged to maintain a balanced arrangement at the gimbal when lifted. Consequently, the weight pairs have been selected in binary increments so that a direct correspondence to the binary coded count in the weight memory 356 may be readily achieved.

Each separate output from the weight memory 356 is conducted to a magnet driver circuit 358. The magnet driver circuit, in one simple form, is a group of transistor switches. Each transister switch is activated when it receives a high signal from its associated memory output of the weight memory 356. When activated, the transister switch conducts electrical current to energize a pair of electromagnets 102. The pair of electromagnets energized lifts the pair of associated weights which total one binary weight increment, corresponding to the binary output signal from the weight memory.

An example better illustrates operation of the preferred embodiment. Assume that a weight of 117.3101 grams is to be weighed. The first coarse or preweigh electronic weight measurement is 117 grams. This count measurement is recorded in the weight memory 356. High signals are present at the memory output conductors indicative of 80, 20, 10, 4, 2, and 1 counts (grams). The transistor switches operatively controlled by these six signals energize the appropriate 12 electromagnets which lift the pair of 40 gram weights, the pair of 10 gram weights, the pair of 5 gram weights, the pair of two gram weights, the pair of 1 gram weights and the pair of ½ gram weights. Consequently, a total of 117 grams has been removed simultaneously from the weight hangers 82, and this weight is within one gram less than the actual weight placed on the weigh pan. Thereafter, the logic control circuit next electrically effects the fine (weigh) measurement, changing the proportionalization factor to electrically measure fractions of grams to electrically measure 0.3101 grams. Signals of the second electrically derived measurement representative of fractions of grams (eg. 0.3101 gram) are added to the prior signal representative of the previous coarse measurement in grams (eg. 117), which has been retained in memory, and the final resultant signal representative of the weight (eg. 117.3101 grams) is then electrically displayed.

OPERATION

In actual use the substitution analytical balance according to the present invention is extremely simple and easy to operate. The master switch 188 provided on the front panel 28 of the balance energizes the voltage regulated power supply 300. After the electronic circuitry stabilizes, the display 26 goes blank and an indication of the preweigh mode is provided at 354.

With the knob 170 returned to the arrest position, an unknown mass is placed in the weigh pan 16 and the slide windows are closed to prevent any disturbance which might be caused by air currents or physical contact during the weighing operation. The release of the control knob causes the beam to be freed with the weight of the unknown object applied to the end 68 of the balance beam 40. The deflection of the beam 40 is registered by the feed back capacitors in conjunction with the feedback circuit board 36. The resulting output signal is conditioned by circuit elements 314, 316, 318, 320, 322 and 324 in the manner described, and is fed through the flip-flop 328 to provide the resultant current to the force coil 52. The energized force coil thus provides a balancing force to the end 58 of the beam 40 to counterbalance and nullify the added unknown weight which has been applied to the pan 16. The resultant output signal from the comparator 322 is converted to a digital output signal through the NAND gates 338 and 340 with this signal directed to the control logic circuit 342. As explained above, the control logic circuitry 342 conducts the proportionalized preweigh (coarse) signal to the memory and counters 348, 350, 352 and 356. The display 354 is appropriately controlled to display an indication of the preweigh measurement. This display indication is calibrated in units of weight (grams) which is the weight of the unknown mass to an accuracy of three digits.

Turning the control knob 170 to the arrest position and back again with the weigh mode light illuminated causes several things to occur as a result of operation of the control logic circuit 342. Upon release of the beam in the weigh mode, the signal stored in the memory 352 as a preweigh measurement is fed to the electromagnet circuit board and its accompanying magnetic driver circuits i.e. 358 where the digital signal automatically selects the correct number of calibrated weights to equal the total weight of the unknown mass less approximately one gram. Upon release of the beam by the control knob in the weigh mode, the corresponding electromagnets mounted under the printed circuit board 38, corresponding to the weights to be removed, are automatically energized. The release of the beam 40 causes the printed circuit board, the electromagnets and the weight hangers corresponding to the energized magnets to be raised causing the lifting of the selected weights from the gimbal support arms 78. The removal of this weight automatically brings the physical balance of the beam 40 into close proximity.

In the weigh or fine weigh mode the force coil, in this embodiment, has a capacity to correct an unbalanced condition of 1½ grams. Thus, with the proper selection of the substitution weights, one gram or less force remains on the beam after the removal of the selected weights. The weighing operation proceeds again with the gain of the circuitry increased to provide the additional desired accuracy. The second electronic digital output signal is added to the first preweigh signal retained in memory, and the resultant signal is displayed with accuracies to seven digits which corresponds to plus or minus 1/10 of one milligram. These accuracies have heretofore required manual weight switching in the use of analytical balances.

By the same token, during the process of weighing as described above, additional features can be provided by the use of the tare switch and circuitry, a number of weighings in a cumulative or sequential arrangement can be made either in the preweigh or weigh mode. If less accuracy is required in the readings desired, then merely weighing in the preweigh mode only can be performed. Thus, weights can be accumulated on the weigh pan by merely weighing first in the preweigh mode and then activating the tare circuit to record the added weight in the memory and returning the display to zero. Weighing of the next object is displayed independent of any previous weighings with this weight being accumulated in the total again by activating the tare circuit. Any number of weights can be added to the accumulated total up to the capacity of the analytical balance. This operation can also be provided in the more accurate weigh mode by performing the same operation in each of the preweigh and weigh mode steps.

In the embodiment of the invention described herein, a total weight capacity for the described analytical balance is intended to be 150 grams. The substitution weights total also 150 grams. It is to be understood that the features and novel benefits of the present invention can be applied to any electronic analytical balance by incorporating the arrangements provided herein. Any size or capacity of analytical balance is capable of utilizing these features. While a new and novel substitution type analytical balance has been shown and described herein in certain detail, it is to be understood that this invention is not to be limited to the arrangement described or shown and that it will be apparent to those having skill in the art that various modifications and changes may be made therein without departing from the spirit or scope of this invention.

What is claimed is:

1. A method of weighing by substituting weights for the unknown mass, the method including the steps of
   a. determining deflection of a pivotally mounted beam caused by the application of an unknown mass to one end of said beam,
   b. generating a first output signal which is responsive to the deflection of said beam,
   c. applying a bias signal to a force coil mounted at one end of the beam to bias said beam to a null reference plane, the bias signal being related to the first output signal,
   d. conditioning said first output signal to energize an electronic display for indicating the weight of said unknown mass,
   e. connecting said first output signal to an electronic circuit to automatically select a number of calibrated weights suspended from the beam on the same end as said unknown mass, the total of the weights selected being slightly less than the measured weight of said unknown mass,
   f. simultaneously and automatically lifting all of said selected weights from said beam to allow said beam to be substantially balanced,
   g. determining the deflection of the beam due to the reduced condition and generating a second reduced output signal proportional to said unbalance to restore said beam to the null reference plane,
   h. conditioning the second output signal to energize the electronic display, and
   i. displaying said first and second output signals by said display to provide an accurate indication of the weight of said unknown mass.

2. In a substitution analytical balance comprising a pivotably mounted balance beam, a gimbal assembly connected at one end of said balance beam, a weight pan suspended from said gimbal assembly, and a plurality of calibrated substitution weights operatively suspended from said gimbal assembly, said substitution weights being disposed for removal from said gimbal assembly to aid in determining the weight of an unknown mass placed in said weigh pan, an improved means for selectively removing the substitution weights from said gimbal assembly during a weighing operation comprising:
   beam arresting means operatively connected with said balance beam for restraining movement of said beam when activated, and
   electromagnetic means for lifting selected substitution weights from said gimbal assembly upon activation of said beam arresting means, said electromagnetic means lifting the selected weights from the gimbal assembly substantially simultaneously.

3. An analytical balance as defined in claim 2 wherein:
   said electromagnetic lifting means includes a plurality of electromagnet means mounted on a support means in corresponding number and position to each individual substitution weight.

4. An analytical balance as defined in claim 3 wherein:
   said substitution weights are suspended and spaced along substantially horizontal support arms mounted on said gimbal assembly, and the support means for said electromagnet means is a printed circuit board positioned substantially horizontal above said substitution weights and arranged to move to and from a position wherein said electromagnet means contact said weights.

5. An analytical balance as defined in claim 4 wherein:

said electromagnet means further includes a weight hanger means which loosely straddles said weight and causes the selected weights to be lifted from said gimbal assembly when the printed circuit board and the energized electromagnet means are raised.

6. An analytical balance as defined in claim 2 wherein:
said electromagnetic lifting means for lifting said selected weights includes a plurality of electromagnets suspended below a planar support means, and
said planar support means is arranged to be lifted whereby the energized electromagnets cause the selected weights to be lifted free of said gimbal assembly so that the unknown mass may be weighed more accurately.

7. An analytical balance as defined in claim 2 wherein said analytical balance further includes a force coil suspended from the end of said balance beam opposite from said gimbal assembly, feedback means for sensing movement of said balance beam from a null reference position, and circuit means interconnecting said feedback means with said force coil for applying a current to said force coil to bias the balance beam to a position approximating the null position.

8. An analytical balance as defined in claim 2 wherein:
said electromagnetic means comprises a plurality of individual electromagnets, each of said electromagnets being positioned in operative relation with a corresponding substitution weight for operatively lifting said substitution weight from said gimbal assembly.

9. An analytical balance as defined in claim 8 further including means operatively supporting said electromagnets for vertical movement relative to said substitution weights, said supporting means being vertically operative to position each of said electromagnets in operative lifting relationship with respect to said substitution weights.

10. An analytical balance as defined in claim 9 further comprising means for supplying an energizing current to selected ones of said electromagnets.

11. An analytical balance as defined in claim 10 including means operatively connecting said supporting means with said arresting means for positioning said electromagnets in operative lifting relation with the substitution weights substantially simultaneously with restraining of movement of said balance beam by said arresting means.

12. An analytical balance as defined in claim 11 wherein said current supplying means supplies current to said electromagnets during the time said electromagnets are in operative lifting relationship with said substitution weights.

13. An analytical balance as defined in claim 12 including means comprising a knife edge support operatively attached to the end of said balance beam for contacting and suspending said gimbal assembly therefrom; and
said arresting means further comprises an arrest frame structure operatively connected to lift said gimbal assembly from its knife edge support at the end of said balance beam upon activation of said arresting means.

14. An analytical balance as defined in claim 13 wherein:
said weight lifting means includes a beam arrest means which restrains the beam against movement when the balance is not in a weighing operation, said beam arrest means being connected to said weight lifting means whereby when the beam arrest means is released, the weight lifting means is elevated to lift said selected weights from said gimbal assembly.

15. An analytical balance as defined in claim 2 including means suspending said substitution weights from said gimbal assembly comprising a horizontally extending elongated weight support element operatively connected to said gimbal assembly and suspending said substitution weights at spaced positions therealong; a plurality of weight hanger members each positioned essentially vertically adjacent a corresponding substitution weight; means for moving said weight hanger members to lift a selected substitution weight from the weight support element, said moving means including a horizontal support plate positioned above said weight support element; and means supporting said plate for vertical movement with respect to said weight support element and for maintaining said plate generally in a horizontal plane during vertical movement thereof; said electromagnetic means being supported on said plate with each electromagnetic means being positioned in vertically spaced and juxtaposed relation with a corresponding weight hanger member.

16. In an analytical balance for accurately weighing an unknown mass, said balance including a pivotably mounted balance beam having a weigh pan suspended from a gimbal assembly positioned at one end of said beam and a force coil operatively attached at the opposite end of said beam, a feedback device arranged to sense the movement of said beam from a null reference position, and circuit means interconnecting said feedback means with said force coil for applying a current to said force coil to bias the balance beam to the null position, the resultant current applied to the force coil being an indication of an unbalanced force applied to said balance beam, the improvement comprising:
converting means for deriving a digital signal related to the magnitude of the resultant current applied to said force coil in response to an unknown weight on the weigh pan;
counter means adapted to receive said digital signal for measuring said digital signal and for producing a count signal related to said digital signal;
a plurality of substitution weights;
means removably suspending said substitution weights from said gimbal assembly;
a plurality of weight lifting means, one weight lifting means being operatively positioned in associated relationship with each substitution weight, each said weight lifting means when electronically energized operatively removing its associated substitution weight from said gimbal assembly; and
driver means adapted to receive said count signal and operative in response thereto for electrically energizing selected ones of said weight lifting means thereby to remove from said gimbal assembly selected ones of the substitution weights.

17. An analytical balance for accurately weighing an unknown mass, said balance including a pivotably mounted balance beam having a weigh pan suspended from a gimbal assembly positioned at one end of said beam and a force coil operatively attached at the opposite end of said beam, a feedback device arranged to sense the movement of said beam from a null reference position, and circuit means interconnecting said feedback means with said force coil for applying a current to said force coil to bias the balance beam to the null position, the resultant current applied to the force coil being an indication of an unbalanced force applied to said balance beam, the improvement comprising:

converting means for deriving a digital signal related to the magnitude of the resultant current applied to said force coil in response to an unknown weight on the weigh pan;

counter means adapted to receive said digital signal for measuring said digital signal and for producing a count signal related to said digital signal;

a plurality of substitution weights;

means removably suspending said substitution weights from said gimbal assembly;

a plurality of weight lifting means, one weight lifting means being operatively positioned in associated relationship with each substitution weight, each said weight lifting means when electrically energized operatively removing its associated substitution weight from said gimbal assembly;

memory means receptive of said count signal for holding said count signal received;

display means operatively connected to said memory means and receptive of said count signal held by said memory means, said display means displaying a visual indication related to said count signal in a predetermined manner; and energizing circuit means operatively connected to energize selected ones of said weight lifting means.

* * * * *